US011085522B2

(12) United States Patent
Pritchard et al.

(10) Patent No.: US 11,085,522 B2
(45) Date of Patent: Aug. 10, 2021

(54) GRAVITY-FED LUBRICATION SYSTEM WITH DISCONNECT FRONT AXLE

(71) Applicant: BorgWarner Inc., Auburn Hills, MI (US)

(72) Inventors: Larry A. Pritchard, Macomb, MI (US); Philip J. Francis, Lapeer, MI (US)

(73) Assignee: BORGWARNER INC., Auburn Hills, MI (US)

( * ) Notice: Subject to any disclaimer, the term of this patent is extended or adjusted under 35 U.S.C. 154(b) by 705 days.

(21) Appl. No.: 15/938,301

(22) Filed: Mar. 28, 2018

(65) Prior Publication Data

US 2019/0301591 A1 Oct. 3, 2019

(51) Int. Cl.
*F16H 57/04* (2010.01)
*B60K 17/342* (2006.01)
*B60K 17/35* (2006.01)

(52) U.S. Cl.
CPC ....... *F16H 57/0446* (2013.01); *F16H 57/045* (2013.01); *F16H 57/0421* (2013.01); *F16H 57/0423* (2013.01); *F16H 57/0424* (2013.01); *F16H 57/0427* (2013.01); *F16H 57/0434* (2013.01); *F16H 57/0436* (2013.01); *F16H 57/0457* (2013.01); *F16H 57/0473* (2013.01); *B60K 17/342* (2013.01); *B60K 17/35* (2013.01); *F16H 57/042* (2013.01); *F16H 57/0441* (2013.01); *F16H 57/0489* (2013.01)

(58) Field of Classification Search
CPC ...... F16H 57/04; F16H 57/042; F16H 57/045; F16H 57/0421; F16H 57/0423; F16H 57/0424; F16H 57/0426; F16H 57/0427; F16H 57/0428; F16H 57/0434; F16H 57/0436; F16H 57/0441; F16H 57/0457; F16H 57/0409; F16H 57/0472; F16H 57/0473; F16H 57/0486; F16H 57/0489; F16H 57/0446; F16H 57/05; F16H 57/057; B60K 17/34; B60K 17/35; B60K 17/342; B60K 17/344
See application file for complete search history.

(56) References Cited

U.S. PATENT DOCUMENTS 9,423,017 B1 8/2016 Francis et al.
9,506,504 B2 11/2016 Francis et al.
(Continued)

*Primary Examiner* — Michael R Mansen
*Assistant Examiner* — Raveen J Dias
(74) *Attorney, Agent, or Firm* — Warn Partners, P.C.

(57) ABSTRACT

A vehicle transfer case is provided having a housing, a primary shaft rotatably mounted within the housing, a secondary shaft selectively driven by the primary shaft, a hub torsionally fixed with the primary shaft, a clutch housing selectively torsionally connected with the hub via a friction pack, an engagement wheel torsionally fixed with respect to the clutch housing and torsionally connected with the secondary shaft via a flexible torsional force member, the friction pack, upon engagement, causing the clutch housing to be selectively connected with the hub, a reservoir system fixed with respect to the housing capturing lubricant energized by result of the operation of the flexible torsional member, the reservoir system delivering splashed lubricant to a reservoir system, and an Archimedes' screw pump delivering lubricant from a sump adjacent to the secondary shaft to the secondary reservoir system.

20 Claims, 17 Drawing Sheets

(56) References Cited

U.S. PATENT DOCUMENTS

| | | | |
|---|---|---|---|
| 9,651,136 B2 | 5/2017 | Francis et al. | |
| 9,752,671 B2 | 9/2017 | Kampe et al. | |
| 9,925,868 B2 * | 3/2018 | Palazzolo | B60K 17/344 |
| 10,274,074 B1 * | 4/2019 | Alexiou | B60K 17/351 |
| 2006/0054407 A1 * | 3/2006 | Wirth | F16H 57/05 |
| | | | 184/6.12 |
| 2010/0101351 A1 * | 4/2010 | Lafer | F16H 57/0421 |
| | | | 74/467 |
| 2010/0180721 A1 * | 7/2010 | Quehenberger | F16H 57/0419 |
| | | | 74/606 R |
| 2015/0240935 A1 * | 8/2015 | Kampe | F16H 57/0489 |
| | | | 474/91 |
| 2015/0323059 A1 * | 11/2015 | Pritchard | F16H 57/05 |
| | | | 184/15.1 |
| 2015/0337948 A1 * | 11/2015 | Leitgeb | F16H 57/0423 |
| | | | 74/665 GE |
| 2016/0040776 A1 * | 2/2016 | Cradit | F16H 57/0434 |
| | | | 192/113.1 |
| 2016/0160713 A1 * | 6/2016 | Reedy | F01M 1/02 |
| | | | 184/6.28 |
| 2016/0341300 A1 * | 11/2016 | Drill | F16D 13/74 |
| 2017/0108111 A1 * | 4/2017 | Steward | F16H 57/0457 |
| 2017/0152933 A1 * | 6/2017 | Drill | F16H 57/05 |
| 2018/0149260 A1 * | 5/2018 | Singh | F16H 57/0417 |
| 2018/0163848 A1 * | 6/2018 | Quinn | F16H 57/05 |
| 2018/0238435 A1 * | 8/2018 | Boerema | F16H 7/02 |
| 2018/0264939 A1 * | 9/2018 | Ryman | F16H 57/04 |
| 2018/0306306 A1 * | 10/2018 | Hamada | F16H 57/0424 |
| 2019/0070947 A1 * | 3/2019 | Aikawa | B60K 6/40 |
| 2019/0309840 A1 * | 10/2019 | Alexiou | F16H 57/027 |
| 2021/0054882 A1 * | 2/2021 | Chatenay | F16H 57/043 |

* cited by examiner

GRAVITY-FED LUBRICATION SYSTEM WITH DISCONNECT FRONT AXLE

FIELD OF THE INVENTION

The present invention relates to transfer cases for normal two-wheel drive automotive vehicles that can be selectively placed manually or automatically into four-wheel drive mode of operation. More particularly, the present invention is typically applicable to transfer cases utilized in vehicles which are normally two-wheel rear drive, having selective engagement of the front wheels for four-wheel drive operation.

BACKGROUND OF THE INVENTION

U.S. Pat. Nos. 9,423,017 (Francis et al.), 9,506,504 (Francis et al.) and 9,752,671 (Kamp et al.), commonly assigned and the disclosures of which are incorporated herein, all provide gravity-fed lubrication system transfer cases for normally two-wheel drive automotive vehicles with selective four-wheel drive operation. To lower cost and weight requirements of the transfer case, the transfer case of the above noted patents have eliminated the need for a separate lubrication pump, although the pump is still required for activation of a clutch pack (sometimes referred to as a friction pack) between a hub on a primary shaft, and a clutch housing that is torsionally fixed with a primary sprocket mounted on the primary shaft.

The primary shaft in the above noted patents is torsionally connected with a secondary shaft via a flexible torsional force member typically provided by a belt or chain. The chain torsionally connects the primary sprocket with a secondary sprocket that is torsionally affixed to the secondary shaft. The secondary shaft powers the vehicle's front wheels via a front differential. Since the secondary shaft is torsionally fixedly connected with the vehicle's front wheels, the chain will continually be spun whenever the front wheels are moving, even if the clutch pack between the hub on the primary shaft and clutch housing connected to the primary sprocket is not engaged.

To enhance fuel economy by reducing parasitic loss, it is desirable to disconnect the front axle by adding a selectively open or closed clutch to the vehicle drive train to allow the secondary shaft to be stationary when the vehicle is in normal two-wheel drive operation. Therefore, the chain does not rotate when the vehicle is in normal two-wheel drive operation. Therefore, it is desirable to provide some type of lubrication when the clutch between the secondary shaft and the front differential of the vehicle is opened.

SUMMARY OF THE INVENTION

To make manifest the above noted and other gainful desires, a revelation of the present invention is brought forth. In a preferred embodiment, the present invention endows the freedom of a vehicle transfer case having a housing, a primary shaft rotatably mounted within the housing, a secondary shaft selectively driven by the primary shaft and rotatably mounted within the housing, a hub torsionally fixed with the primary shaft, a clutch housing selectively torsionally connected with the hub via a friction pack, an engagement wheel torsionally fixed with respect to the clutch housing and torsionally connected with the secondary shaft via a flexible torsional force member. The friction pack, upon engagement, causes the clutch housing to be selectively connected with the hub. A reservoir system fixed with respect to the housing is provided for capturing lubricant energized by result of the operation of the flexible torsional member. The reservoir system delivers splashed lubricant to a reservoir system. An Archimedes' screw delivers lubricant from a sump adjacent to the secondary shaft of the reservoir system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
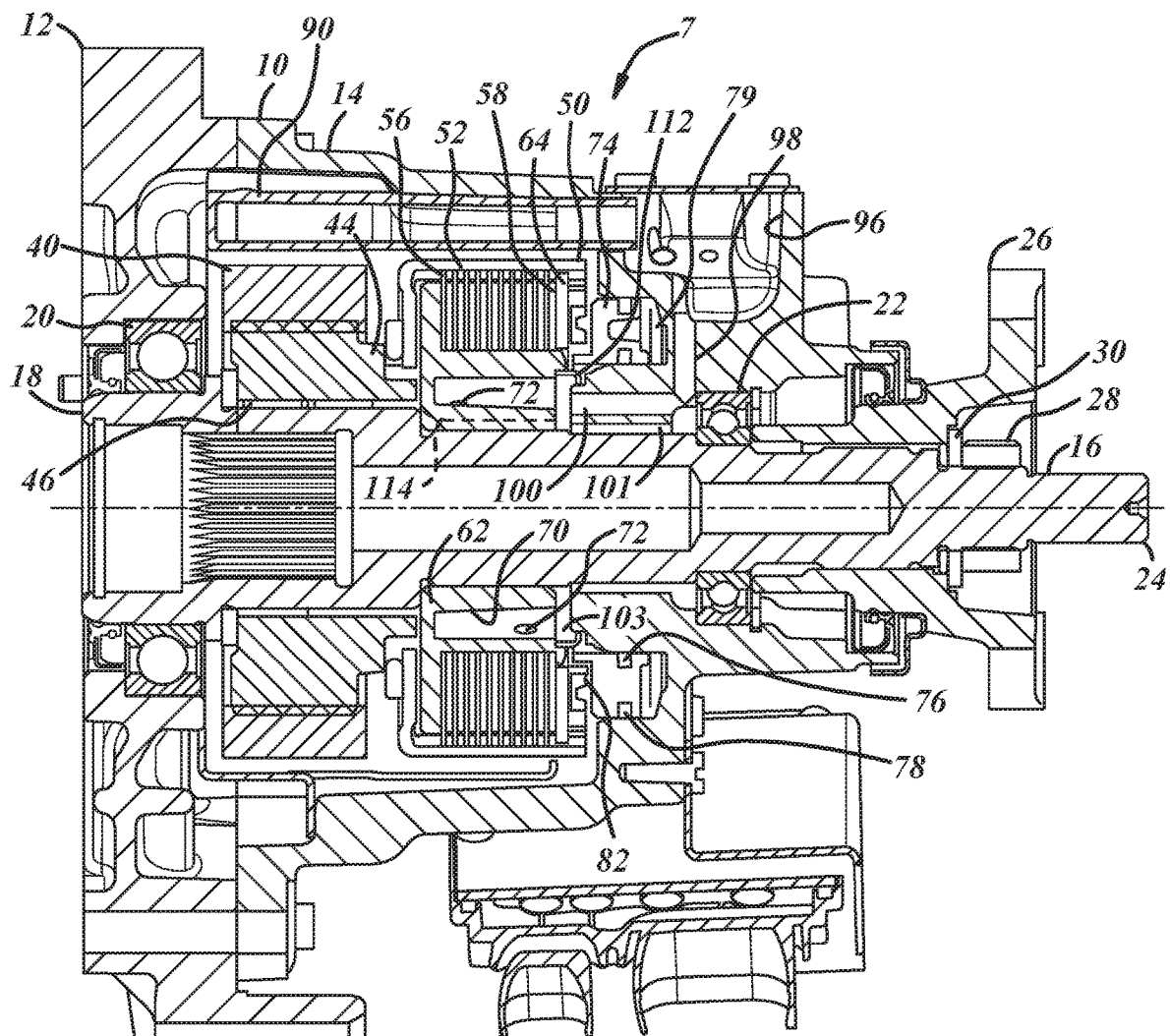
FIG. 1 is a sectional view of a transfer case that can utilize an Archimedes' screw pump according to an apparatus of the present invention.
Figure 5:
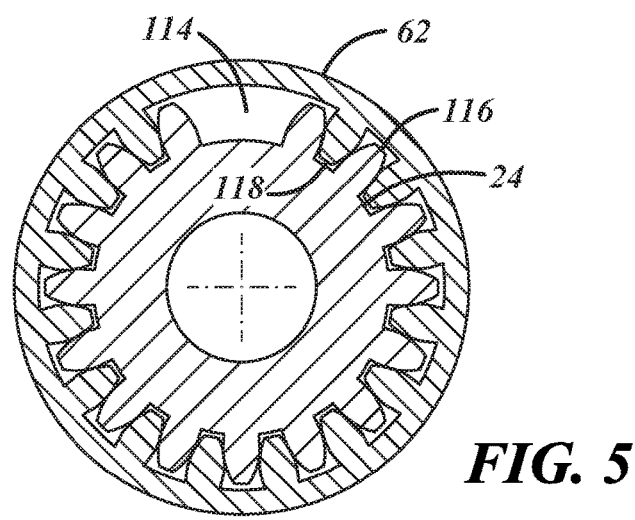
FIG. 5 is a partial sectional view illustrating a lubrication path extending between the hub and a primary shaft of the transfer case shown in FIGS. 1-4.
Figure 2:
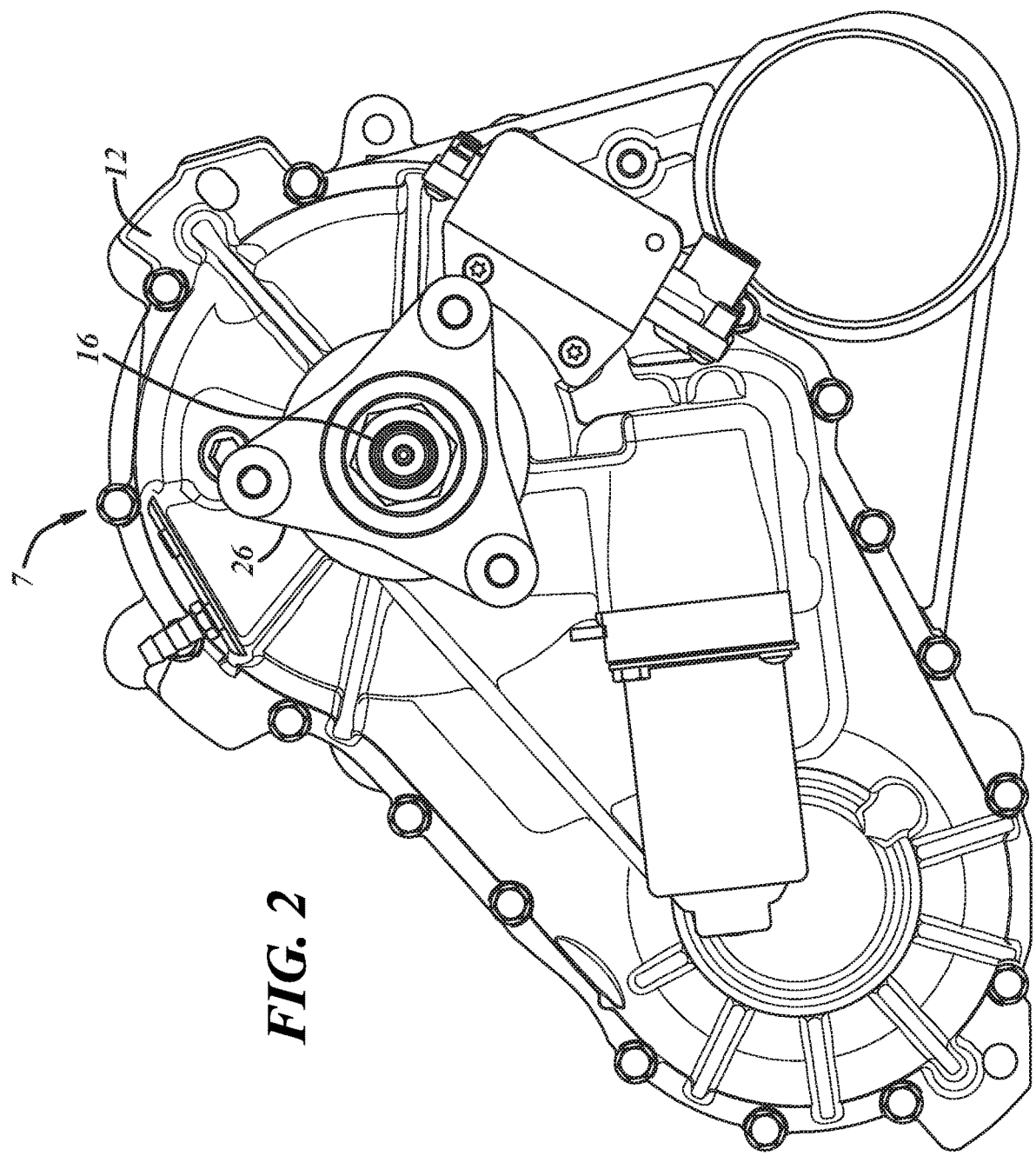
FIG. 2 is a rear elevational view of the transfer case shown in FIG. 1.
Figure 3:
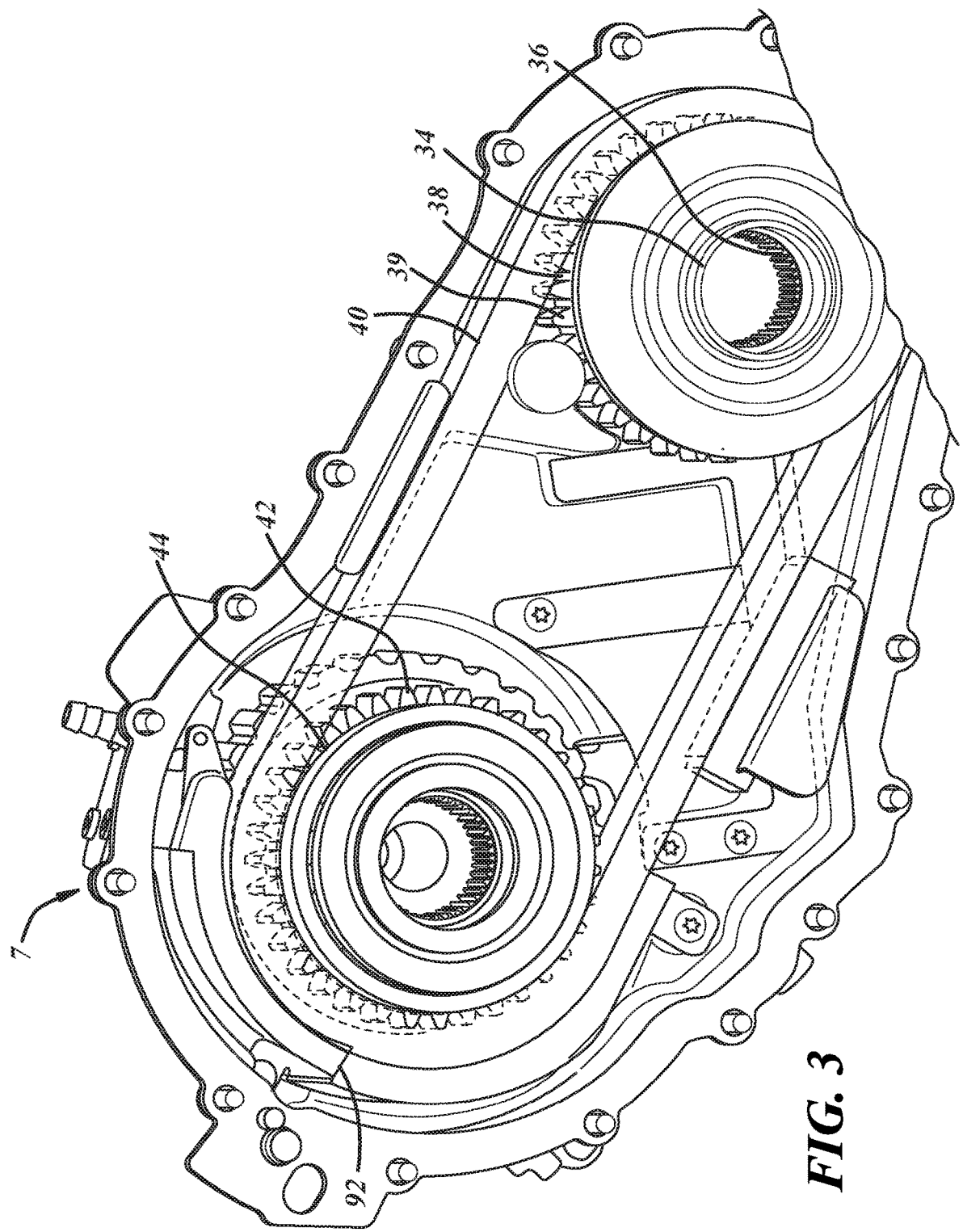
FIG. 3 is a front perspective view of the transfer case shown in FIGS. 1 and 2 with a front cover plate removed.
Figure 4:
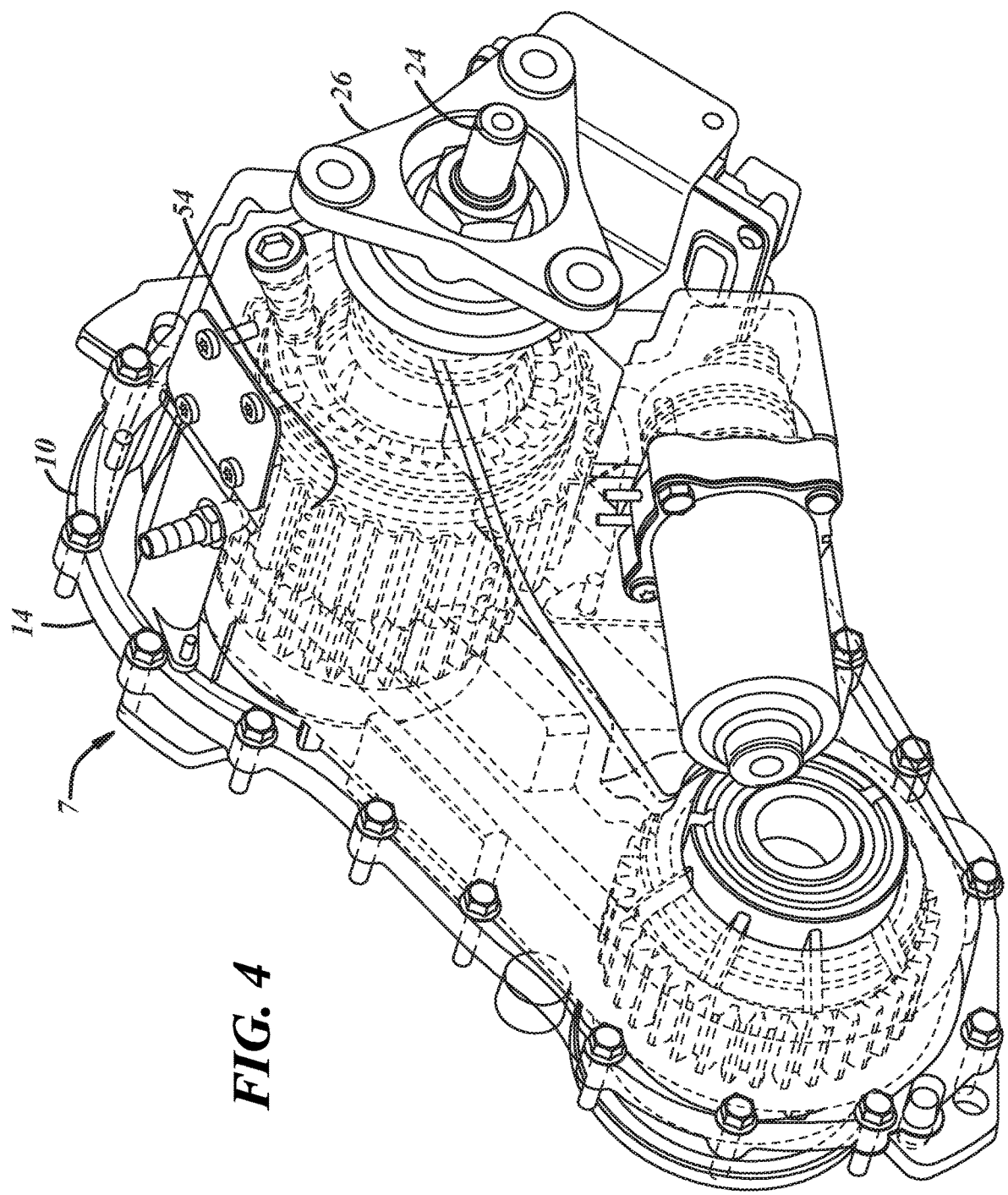
FIG. 4 is a rear perspective view with portions of the transfer case shown phantom in FIGS. 1-3.
Figure 6:
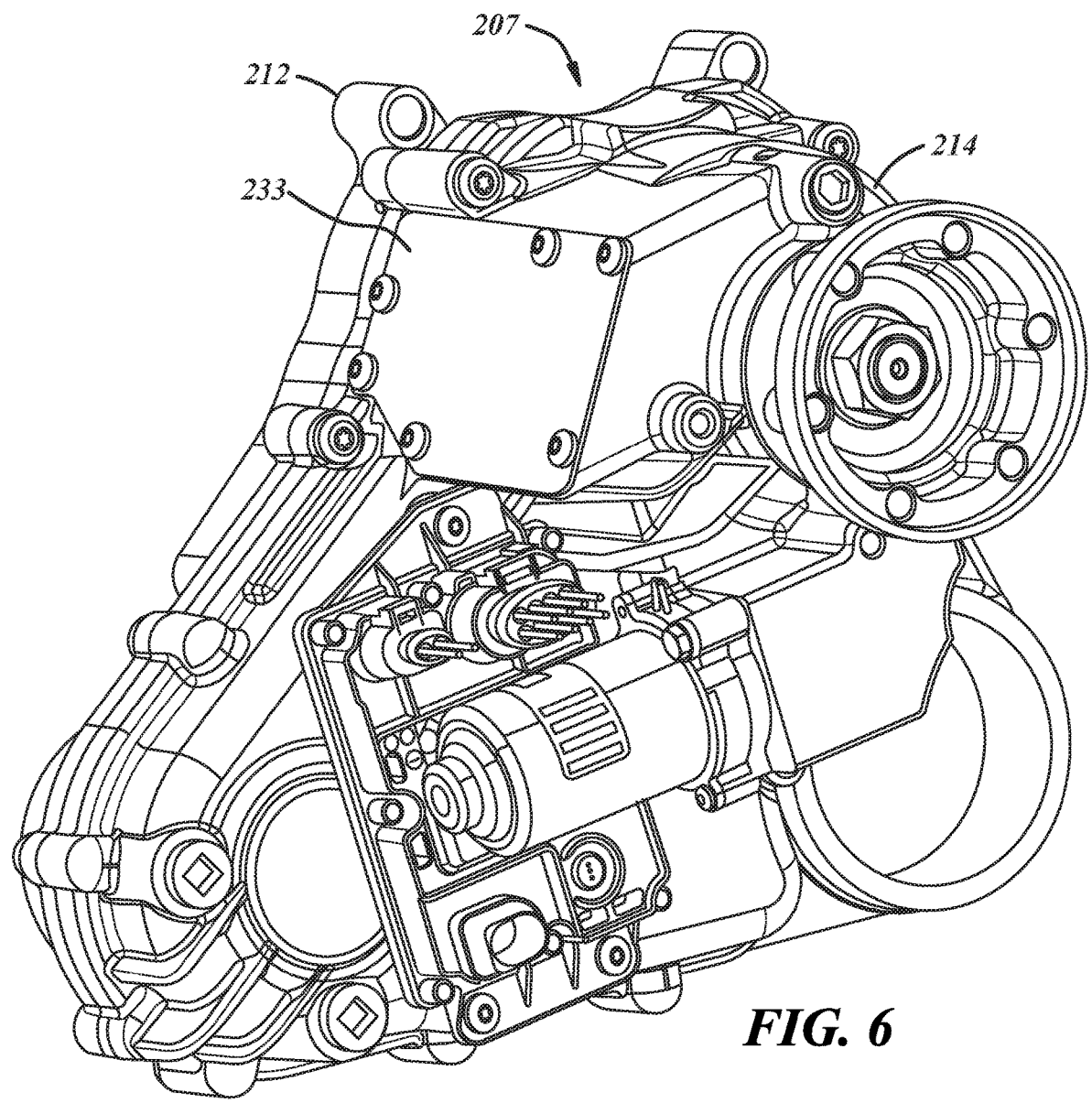
FIG. 6 is a rear perspective view of an alternative preferred embodiment transfer case according to the present invention, with an Archimedes' screw pump being removed for clarity of illustration.
Figure 7:
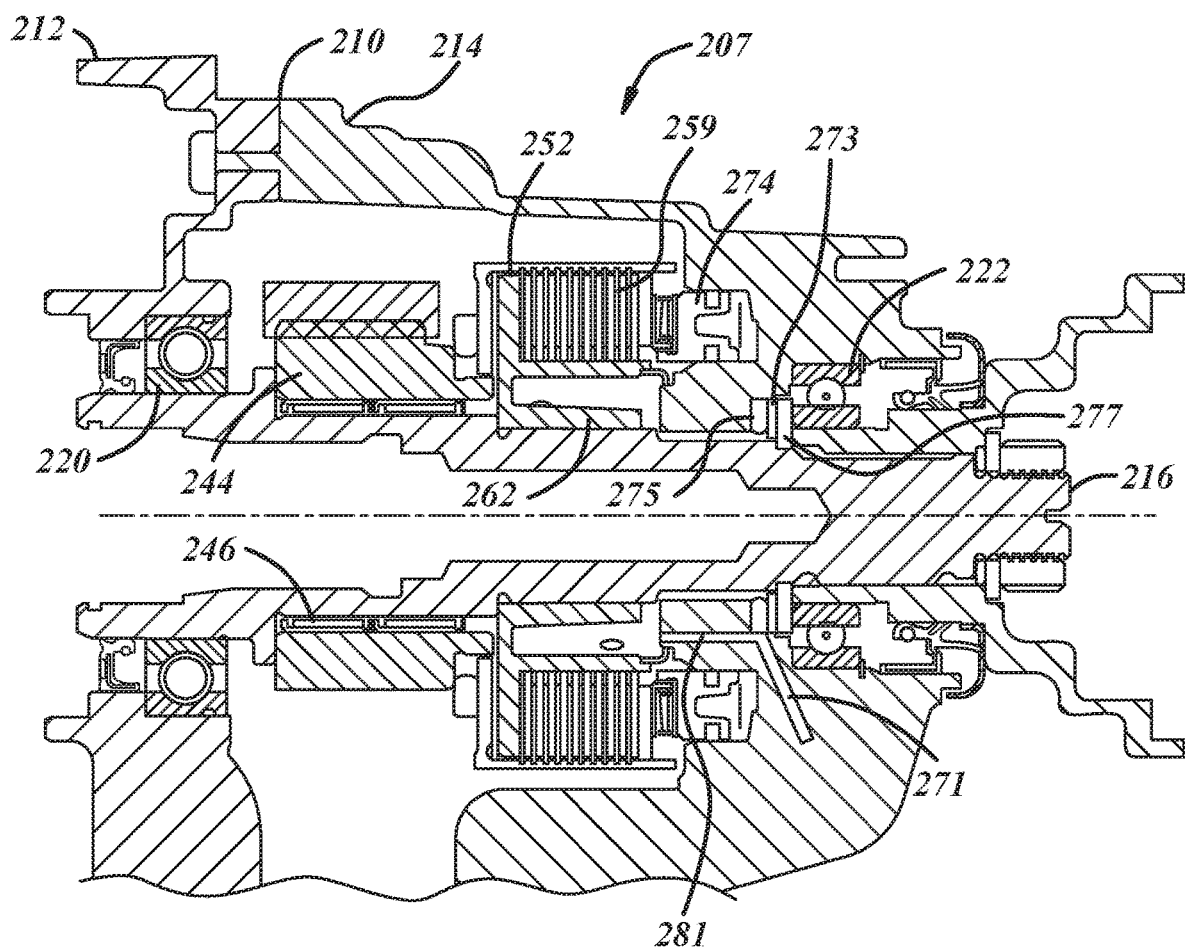
FIG. 7 is an enlarged partial side sectional view of the transfer case shown in FIG. 6.
Figure 8:
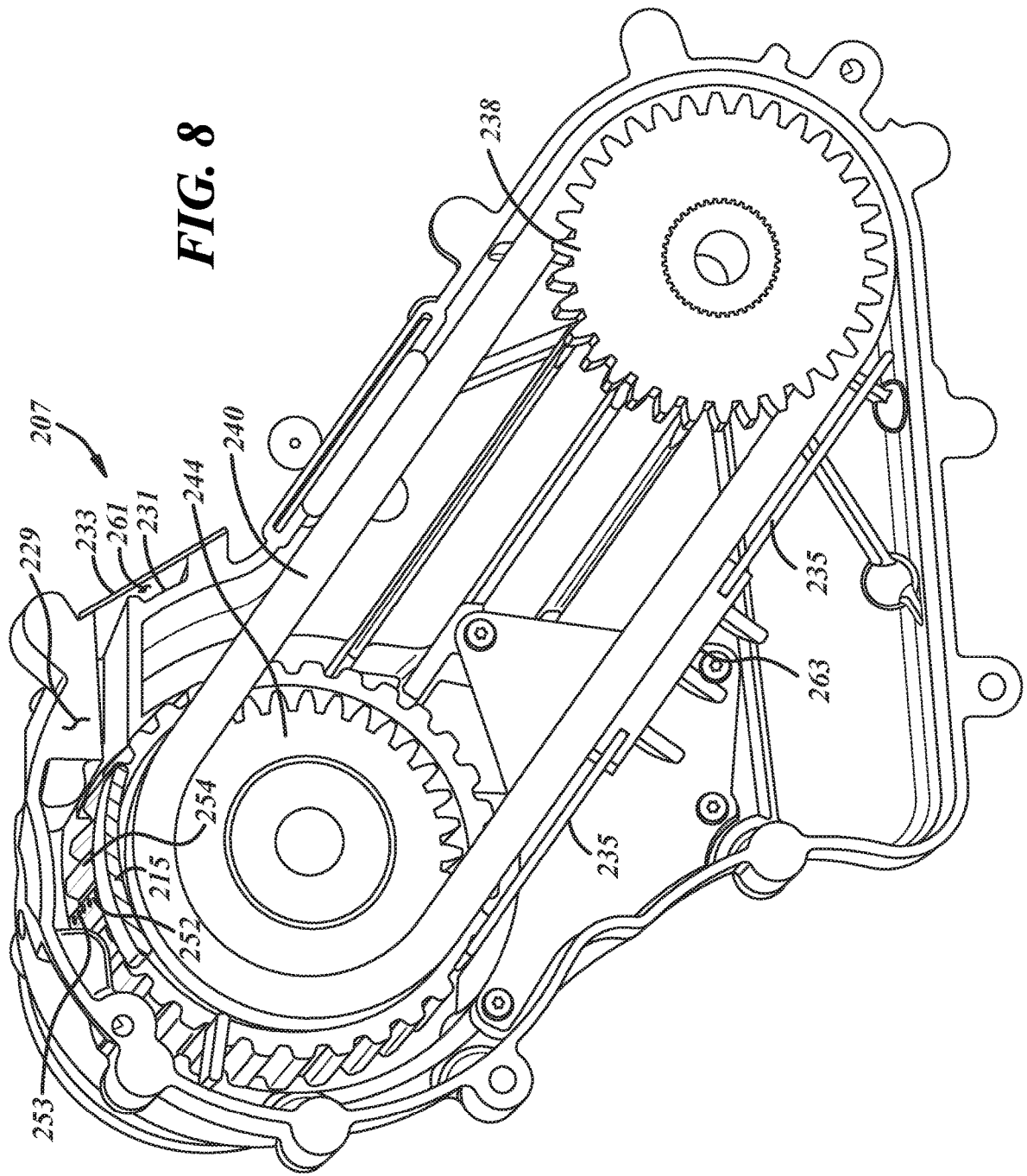
FIG. 8 is a sectional perspective view of the transfer case shown in FIG. 6 with most of the front cover removed for illustration.
Figure 9:
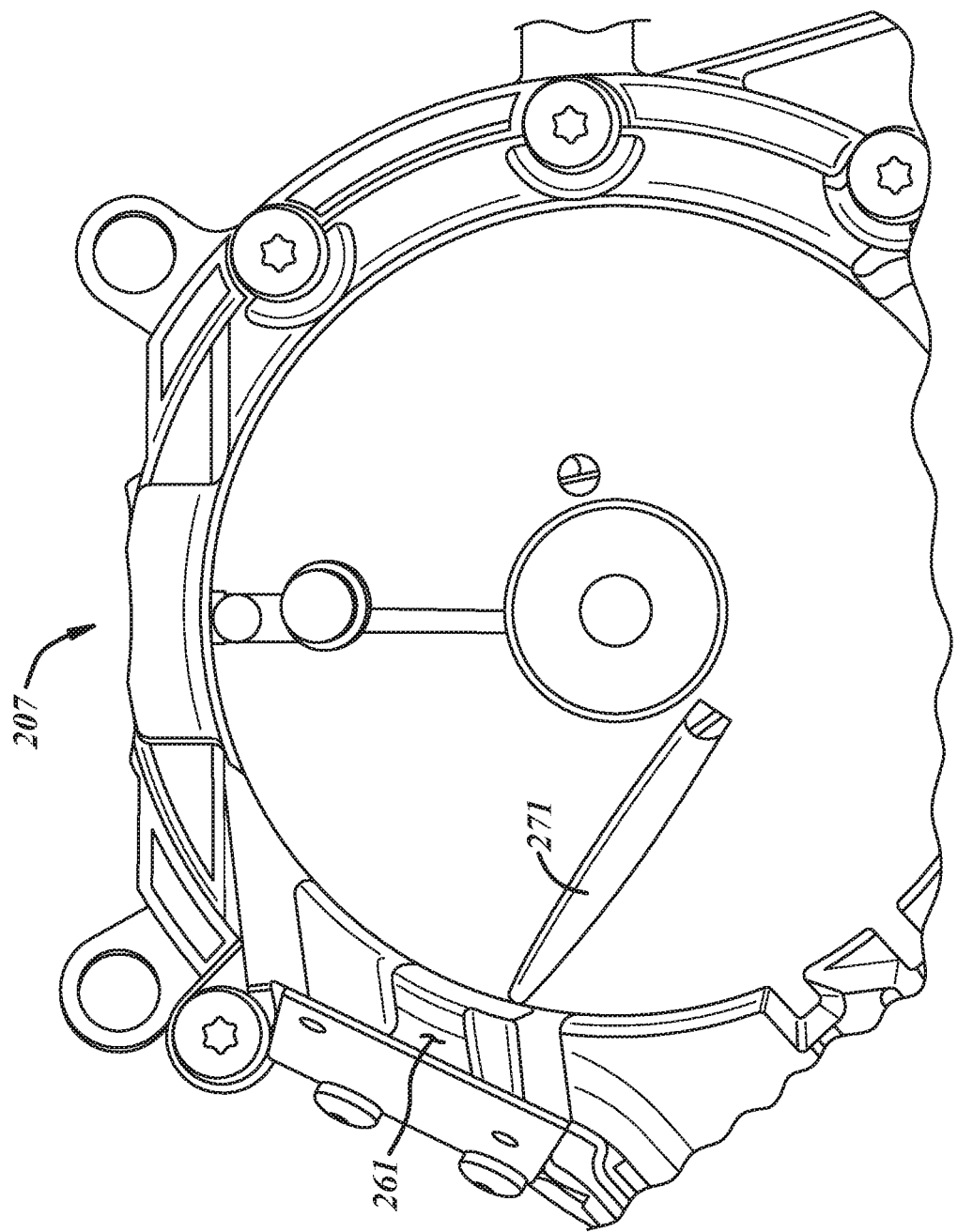
FIG. 9 is another partial side sectional perspective view of the transfer case shown in FIG. 6.

The following description of the preferred embodiment(s) is merely exemplary in nature and is in no way intended to limit the invention, its application, or uses.

Referring to FIGS. 1-5, a transfer case 7 according to the present invention is provided. The transfer case 7 has a housing 10. The housing 10 has a front cover plate 12 which is boltably connected to a main body 14. Rotatably mounted within the transfer case housing 10 is a primary shaft 16. The primary shaft 16 has a front end 18 conformed to connect with an output shaft (not shown) of a transmission of the vehicle. Typically, the vehicle will be a rear wheel drive vehicle with a longitudinally mounted engine. The drive train for the vehicle is configured in such a way that power can be selectively diverted from the rear axle to be shared with the front axle to provide the vehicle with all-wheel drive capabilities. The primary shaft is mounted to the front cover plate 12 by a front bearing 20. A rearward portion of the main axle 16 is rotatably mounted within the housing main body 14 by a rear bearing 22. A rear end 24 of the primary shaft is connected with a yoke 26 by a nut 28 which captures a washer 30. The yoke 26 is connected with a drive line extending to a vehicle rear differential and axle (not shown).

At a lower elevation, the transfer case 7 also rotatably mounts a secondary shaft 34. The secondary shaft 34 is configured to have in its inner diameter splined teeth 36 to allow the secondary shaft 34 to power either directly or via a universal type joint, a front drive line shaft (not shown) that is torsionally connected with a differential for front wheels of the vehicle. An exterior of the secondary shaft is a connected sprocket 38 provided with a series of sprocket teeth 39. The sprocket teeth 39 engage a flexible torsional force transfer member or a belt 40 (shown schematically) which is typically provided by a multi-link chain. The belt 40 is engaged with sprocket teeth 42 provided on the engagement wheel or primary sprocket 44. The primary sprocket 44 is rotatably mounted on the primary shaft 16 by needle bearings 46. In other embodiments (not shown), the primary sprocket can instead be a gear in direct or indirect gear connection with the secondary shaft.

To allow the primary shaft 16 to selectively torsionally engage the secondary shaft 36, there is provided a clutch 50. The clutch 50 includes a clutch housing 52. The clutch housing 52 is torsionally fixably connected with the primary shaft sprocket 44. The clutch housing 52 has a series of radial folds 54 which provide radially inward projecting teeth which engage with correspondingly shaped radial edges of friction discs 56. The friction discs 56 are intermingled with corresponding friction plates 58. The friction plates 58 along their inner diameter have a gear tooth type profile to allow them to be torsionally connected with a hub 62 having radially outward corresponding folds. The hub 62 is torsionally affixed with the primary shaft 16 by weld, spline or shrink fit arrangement. A backing plate 64 is also provided. The backing plate 64, as well as friction plates 58 and friction discs 56, form a friction pack to allow for selective connection of the clutch housing 52 with the clutch hub 62 thereby causing the sprocket 44 to be joined with the primary shaft 16.

The hub 62 has a multiple series of lubrication axial extending passages 70. The axial passages 70 are intersected with radially outward projecting lubrication holes passages 72 which deliver lubricant to the friction pack. To selectively engage the friction pack, there is provided a piston 74. The piston 74 has a radially inner seal 76 and a radially outer seal 78. Axially behind the piston 74 is a pressurizable chamber 79 which is connected by a passage (not shown) with a source of pressurized fluid (not shown). When actuated, the piston 74 engages a bearing 82 which is adjacent to the backing plate 64 to engage this friction pack thereby torsionally connecting the hub 62 and primary shaft 16 with the sprocket 44, belt 40 and secondary shaft 34 to torsionally power the front wheels of the vehicle.

When the front wheels are engaged, there is need for lubricant to be delivered to the clutch pack. The lubricant may also add as a coolant. Lubricant is also delivered to the belt 40 and the sprockets 44 and to the secondary shaft 36.

As the chain moves, lubricant oil is splashed. Much of the oil is splashed into a reservoir system that includes collection baffle 90 having an entrance 92 generally adjacent the primary sprocket 44. The momentum of the lubricant oil causes the lubricant to be transported in an axial direction above the primary shaft 16 and above axially overlapping the piston 74 the clutch 50 and its associated friction pack. The lubricant is then collected in a collective fluid receptacle 96. The fluid receptacle 96 is formed in the body 14 of the housing. The fluid receptacle 96 is stationary and has an air bleed to allow for removal of entrapped air within the oil. The collection of oil develops a pressure head which enters a stationary housing vertical passage 98. The vertical passage 98 intersects with the rear bearing 22 to lubricate the same. Intersecting the vertical passage 98 is a stationary housing generally axial passage 100. Thus the flow of oil is additionally radially inward of the friction pack. Axial passage 100 allows the oil under the pressure heads supplied by the reservoir to travel axially in a generally forward direction flow into an axial extending lubricant passage 70 provided in the hub. One factor which enhances the performance of the lubrication is that when the lubricant is being transported vertically inward through passage 98 there are no rotating member which it must pass. Oil entering the axial lubrication passage 70, then through rotation, the oil is urged radially outward through lubrication holes 72 to lubricate the friction pack.

Radially inward of the lubrication passage 100 is an inner lubrication passage 101. Inner lubrication passage 101 intersects with a disc shaped space 103. The disc shaped space 103 is bordered by a seal 112 which prevents lubrication oil from being pushed towards to piston 74. The primary shaft 24 is splined to the hub 62 by a series of radially outward extending teeth 116 interacting with radially inward extending teeth 118 of the hub. One or more of the teeth 116 or 118 are deleted to provide a lubrication passage 114 which extends between the interface of the hub and a primary shaft allowing lubricant to flow from the rear of the hub to the front of the hub and thereby reach needle bearings 46 which rotatively mount the primary sprocket 44 to the primary shaft.

Referring to FIGS. 6-9, an alternative preferred embodiment transfer case 207 according to the present invention is provided. The transfer case 207 has a housing 210 with a front cover 212 and a main body 214. Transfer case 207 has a primary shaft 216 rotatively mounted to the front cover plate 212 by a front bearing 220. Spline connected to the primary shaft 216 is a hub 262 that is connected to the primary shaft 216 in a manner as previously described and also having an axial extending lubrication passage and is interfaced with the primary shaft 216 as previously described having a lubrication passage similar to passage 114.

Rotatably mounted on the primary shaft 216 by needle bearings 246 is a primary sprocket 244. Primary sprocket 244 is fixably connected with a clutch housing 252. The clutch housing 252 can be selectively engaged with the primary shaft 216 and hub 262 in a manner as previously described by virtue of a friction pack which can be selectively engaged by a piston 274. The front plate cover 212 has connected thereto a baffle 215. The baffle 215 is positioned generally adjacent to a chain 240 which transmits torque between a primary sprocket 244 and a secondary sprocket 238. Transfer case 207 also has a lower slack adjuster 263 which has extending there from two lubricant retainers 235. The lubricant retainers 235 function to help retain lubricant within the chain 240 as the chain 240 moves from the lower secondary sprocket 238 to the primary sprocket 244. The lubricant in normal usage is pooled in the bottom of the housing 210. The clutch housing 252 also has a series of axially spaced holes 253 to allow for the escape of lubricant in the friction pack beyond the clutch housing. The holes 253 are typically be on top of the radial folds 254 of the clutch housing.

As the chain 240 rotates, oil escapes the chain 240 and is diverted by baffle 215 an adjacent entrance of the reservoir system 229. Oil also escapes the holes 253 and goes to the reservoir system 229. A collective fluid receptacle 261 is formed by the housing 214 on an exterior side 231 of the housing opposite an interior side exposed to the clutch housing 252. A cover for the fluid receptacle 261 is provided by a plate 233. The plate 233 is connected and exposed to the exterior side 231 of the housing. The fluid receptacle 261 is intercepted by a stationary fluid passage 271 which is vertically reclined. The stationary passage 271 brings lubrication oil to an area adjacent the bottom half of the primary shaft 216 to lubricate the rear bearing 222 and an axial needle bearing 273. The axial needle bearing 273 is adjacent to thrust washers 275 and 277 which allow the housing to absorb the axial force caused by engagement of the clutch provided by the clutch housing 252 and the hub 262. The lubrication passage 271 is intersected by a generally axial lubrication passage 281 which then brings oil under pressure from the hydraulic head established in the collective receptacle 261 to the hub and needle bearings 246 generally as previously described. One of the vital features of transfer case 207 is that oil will circulate through the transfer case regardless of whether or not the hub is engaged with the clutch housing 252 by virtue of the friction pack 259.

Figure 10:
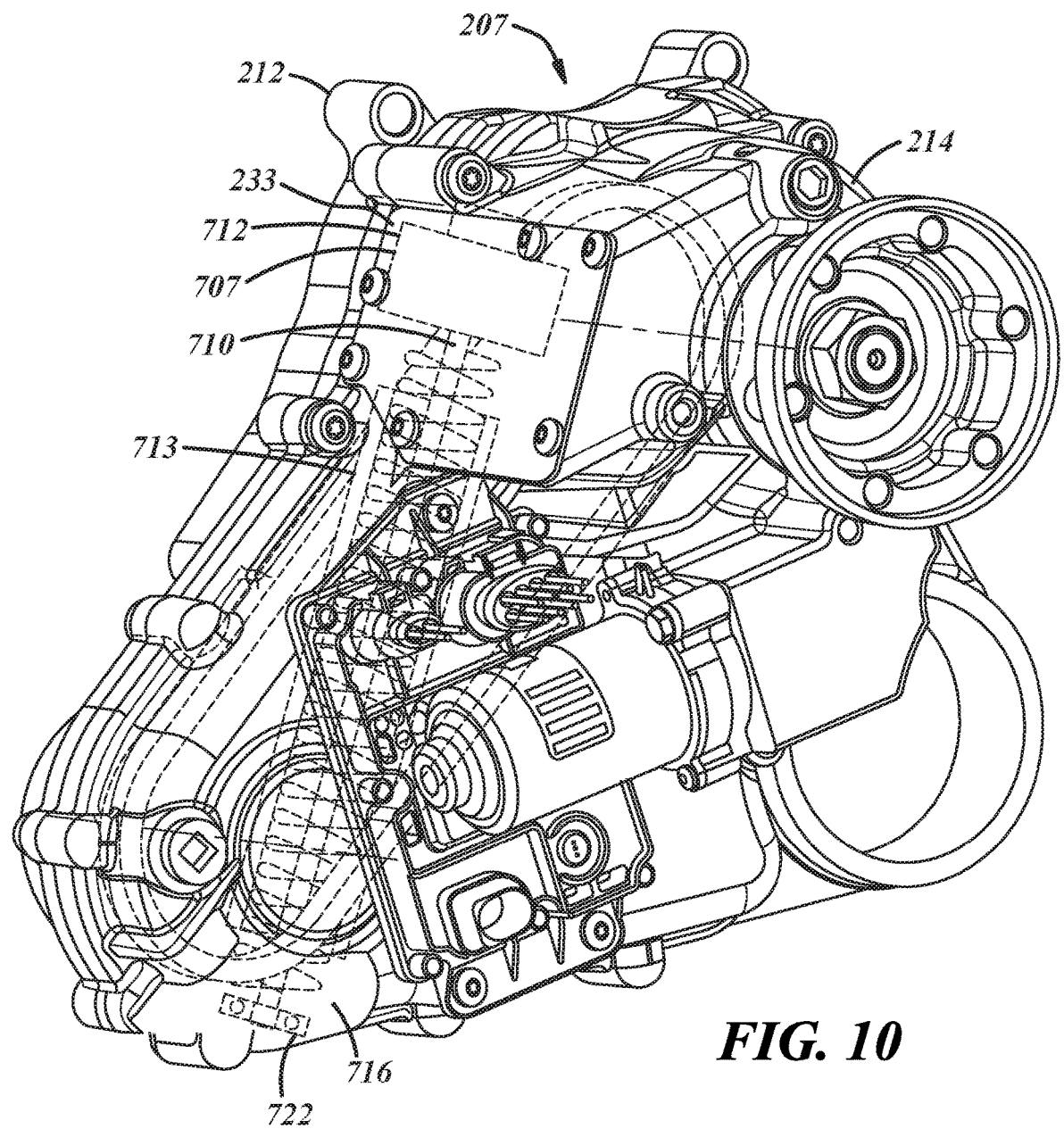
FIG. 10 is a view similar to FIG. 6, additionally illustrating the Archimedes' screw pump.
Figure 11:
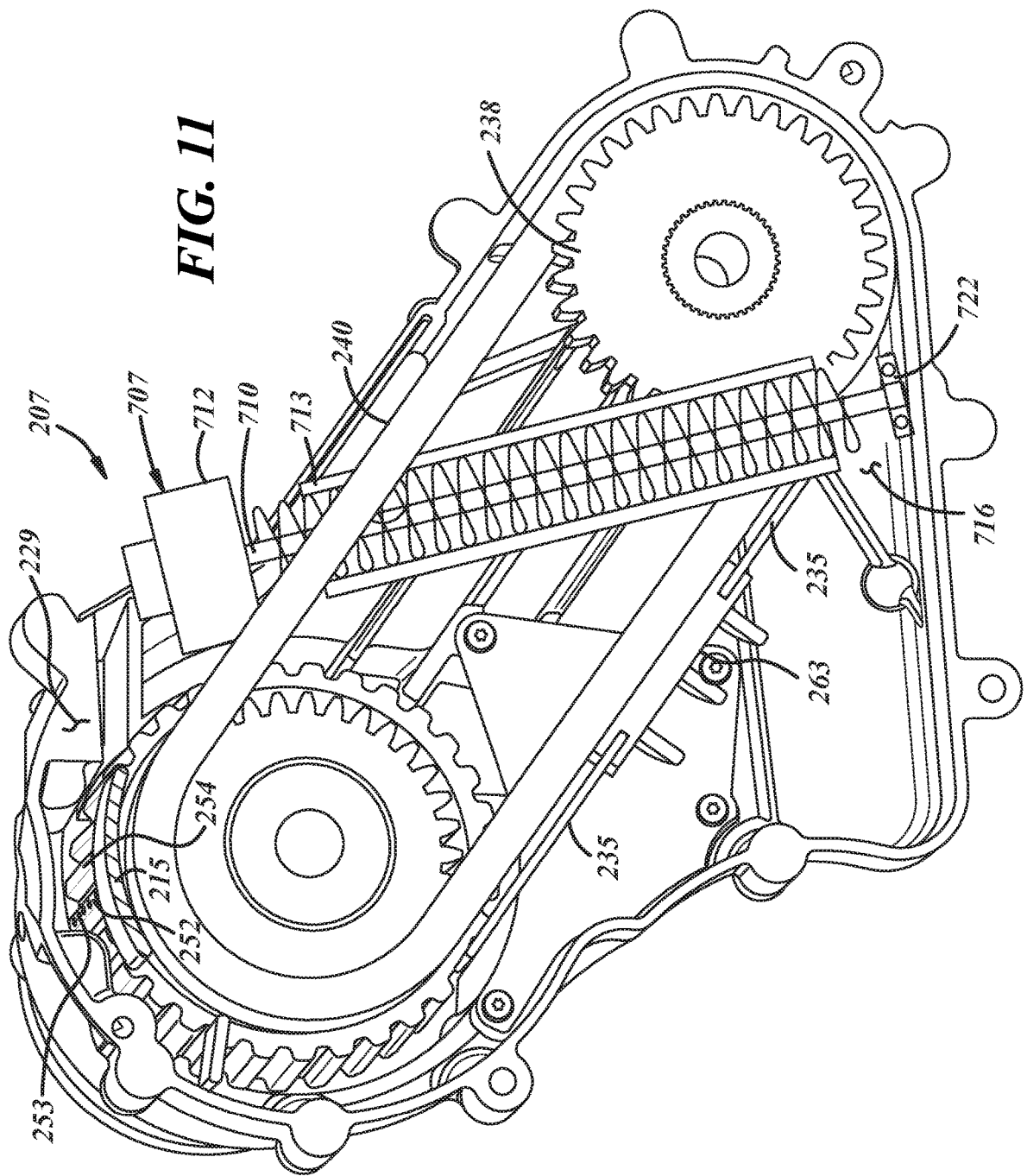
FIG. 11 is a view similar to FIG. 8, additionally illustrating the Archimedes' screw pump.

Referring to FIGS. 10 and 11, the vehicle transfer case of the present invention further includes an Archimedes' screw pump 707. An Archimedes' screw pump has a relatively low current draw. The Archimedes' pump 707 is positioned internally within the transfer case housing. The Archimedes' screw has a shaft 710 and is powered by an on demand motor/drive 712. The motor/drive 712 is typically electrically powered. The motor/drive 712 powers the shaft 710. Shaft 710 rotates within a stationary cover 713 via bearing 722. The Archimedes' screw pump 707 delivers lubricant from a sump 716 that is adjacent secondary shaft weekly position, typically underneath the secondary shaft, to the reservoir system preferably at the fluid receptacle 261. The pump 707 is diagonally located through the flexible torsional force member or chain 240 with a sump end forward of the secondary sprocket 238. The Archimedes' screw may be a standard screw, or can have a variable pitch or have multiple starts.

In operation (during normal rear two-wheel drive operation), a clutch mechanism (not shown) between a front wheel differential of the vehicle and the secondary shaft is opened to cut down on parasitic losses. Therefore, the chain 240 is not rotating. To ensure proper lubrication, pump 707 of the clutch pack is powered upon ignition of the vehicle engine based upon a position of the ignition key or switch. Thereupon fluid is delivered from the transfer case sump to the reservoir system, most often to the fluid receptacle. The motor/drive pump 707 can also be initiated to supplement the lubricant based upon a relationship to engine speed or power demand.

Figure 12:
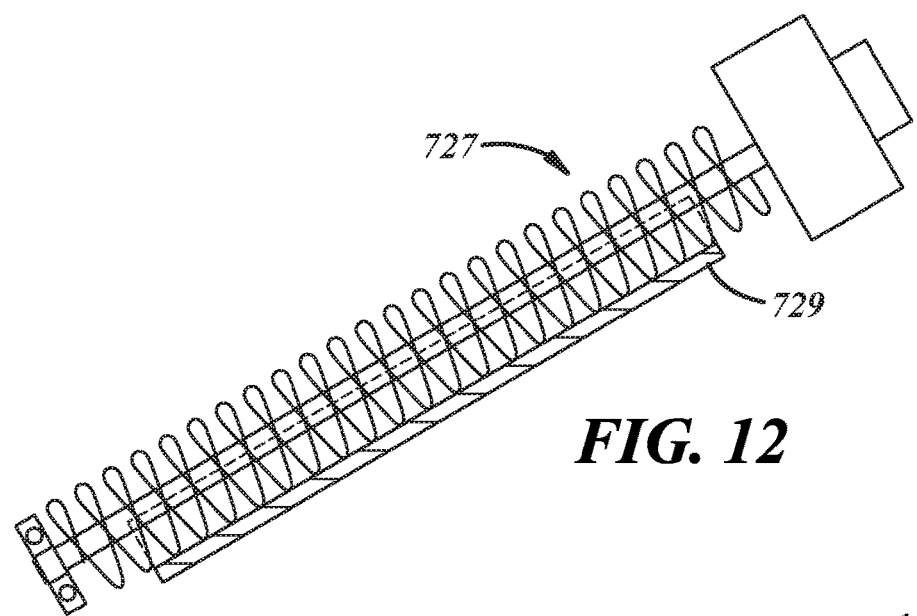
FIG. 12 is a sectional view of an alternate embodiment Archimedes' screw pump that can be utilized in the transfer case, similar to that shown in FIGS. 10-11.
Figure 13:
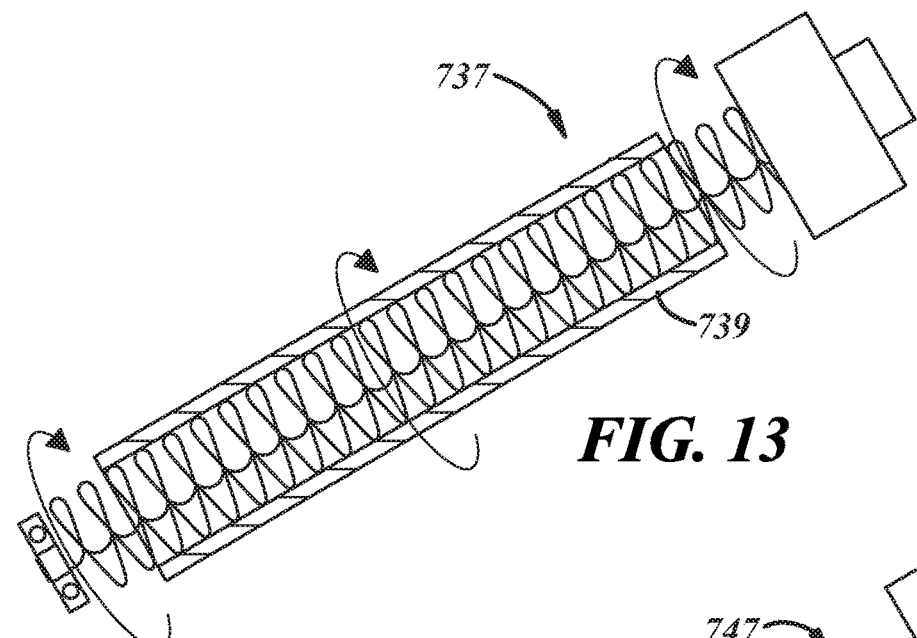
FIG. 13 is a sectional view of an alternative embodiment Archimedes' screw pump that can be utilized in the transfer case, similar to that shown in FIGS. 10-11.
Figure 14:
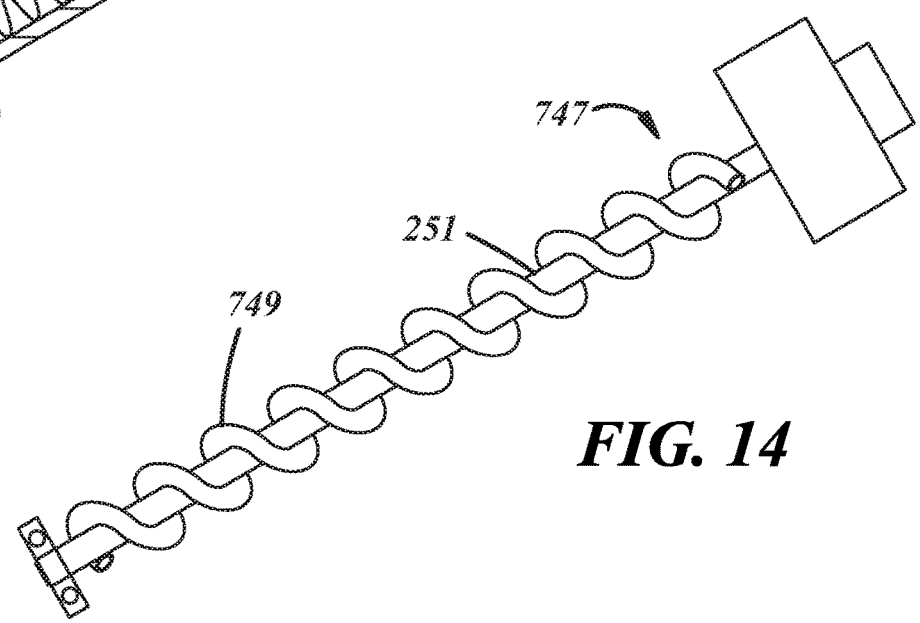
FIG. 14 is a side elevational view of an alternate embodiment Archimedes' screw pump that can be utilized in the transfer case, similar to that shown in FIGS. 10-11.

Referring to FIG. 12, an alternative Archimedes' screw pump to that shown in FIGS. 10-11 is pump 727. FIG. 12 illustrates an Archimedes' pump 727 with an open cover 729. FIG. 13 provides an Archimedes' screw pump 737 with a rotating cover 739. FIG. 14 illustrates an Archimedes' screw pump 747 with a tubular-type rotor impeller 749 wrapped around a rotating shaft 251.

Figure 15:
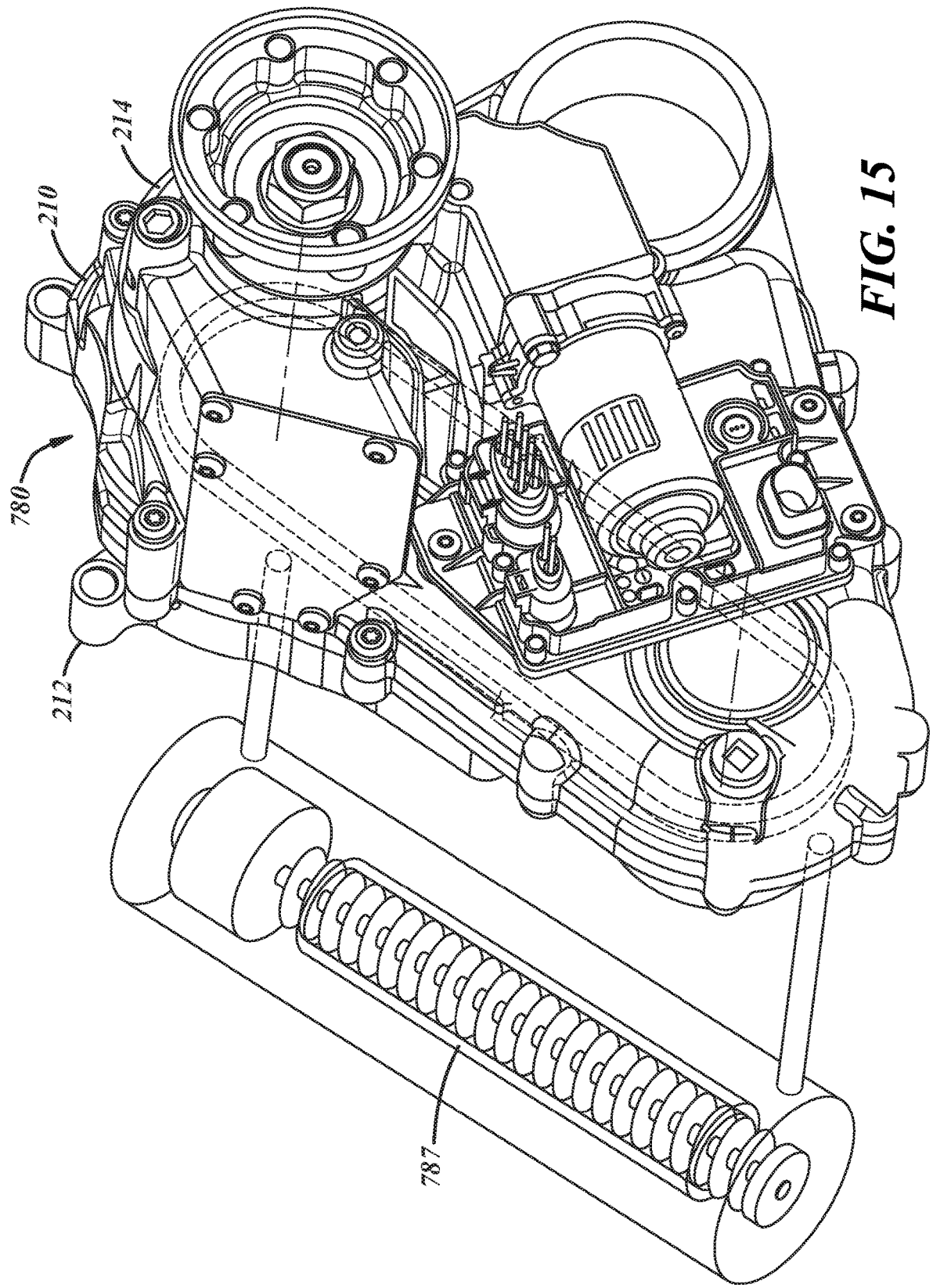
FIG. 15 is a perspective view of an alternate preferred embodiment transfer case according to the present invention.

Referring to FIG. 15, an alternate preferred embodiment transfer case 780 is provided having an Archimedes' screw pump 787 externally of housing fluidly connected at its lower end to a sump of the transfer case and at its upper end to the reservoir system. The pump 787 is positioned forward of the transfer case housing 210.

Figure 16:
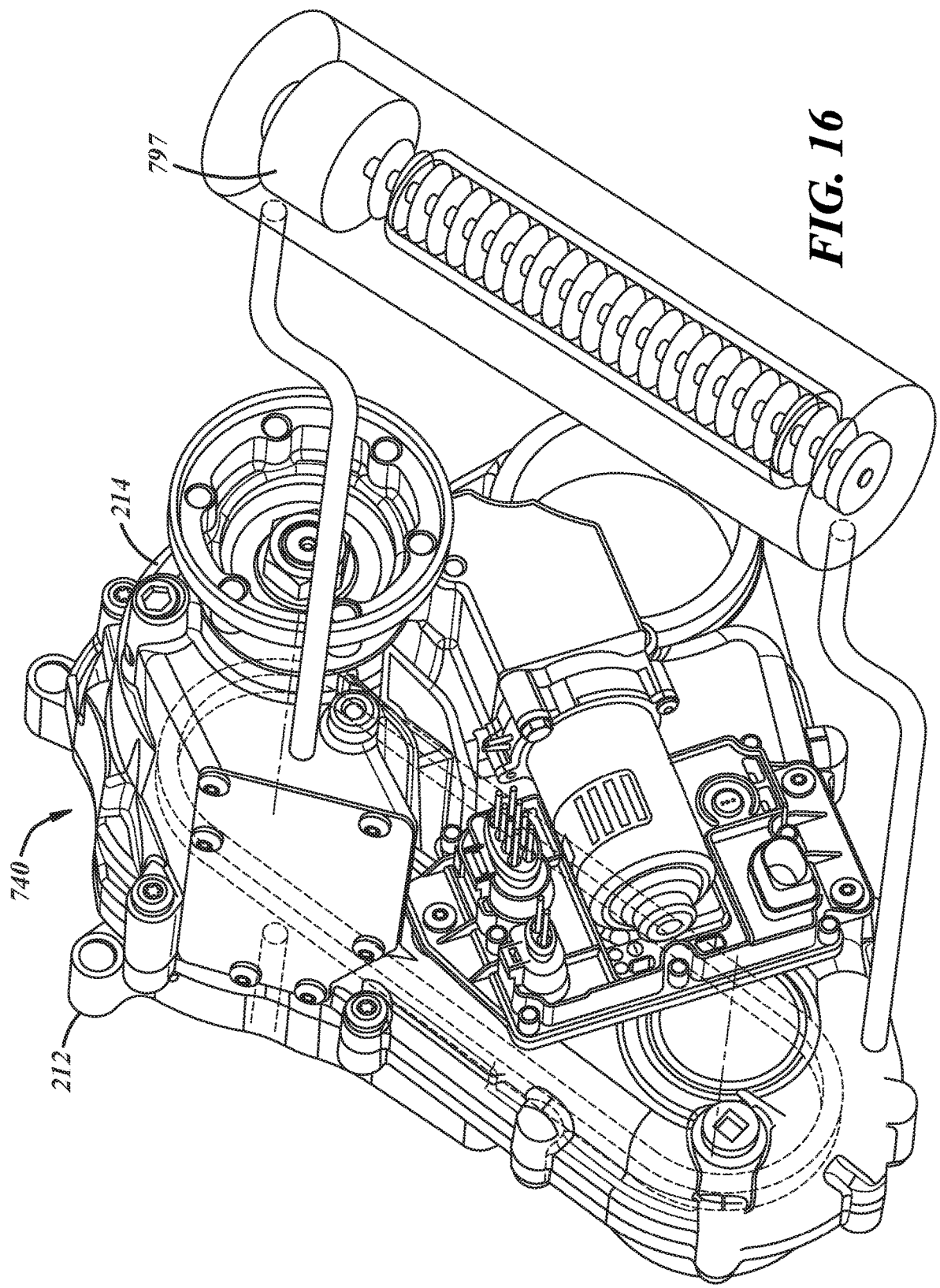
FIG. 16 is a perspective view of an alternate preferred embodiment transfer case according to the present invention.

Referring to FIG. 16, an alternate preferred embodiment transfer case 740 is provided, having an Archimedes' screw pump 797, external of the housing, fluidly connected at its lower end to a sump of the transfer case at its upper end to the reservoir system fluid receptacle wherein pump 797 is positioned rearward of the transfer case housing 210.

Figure 17:
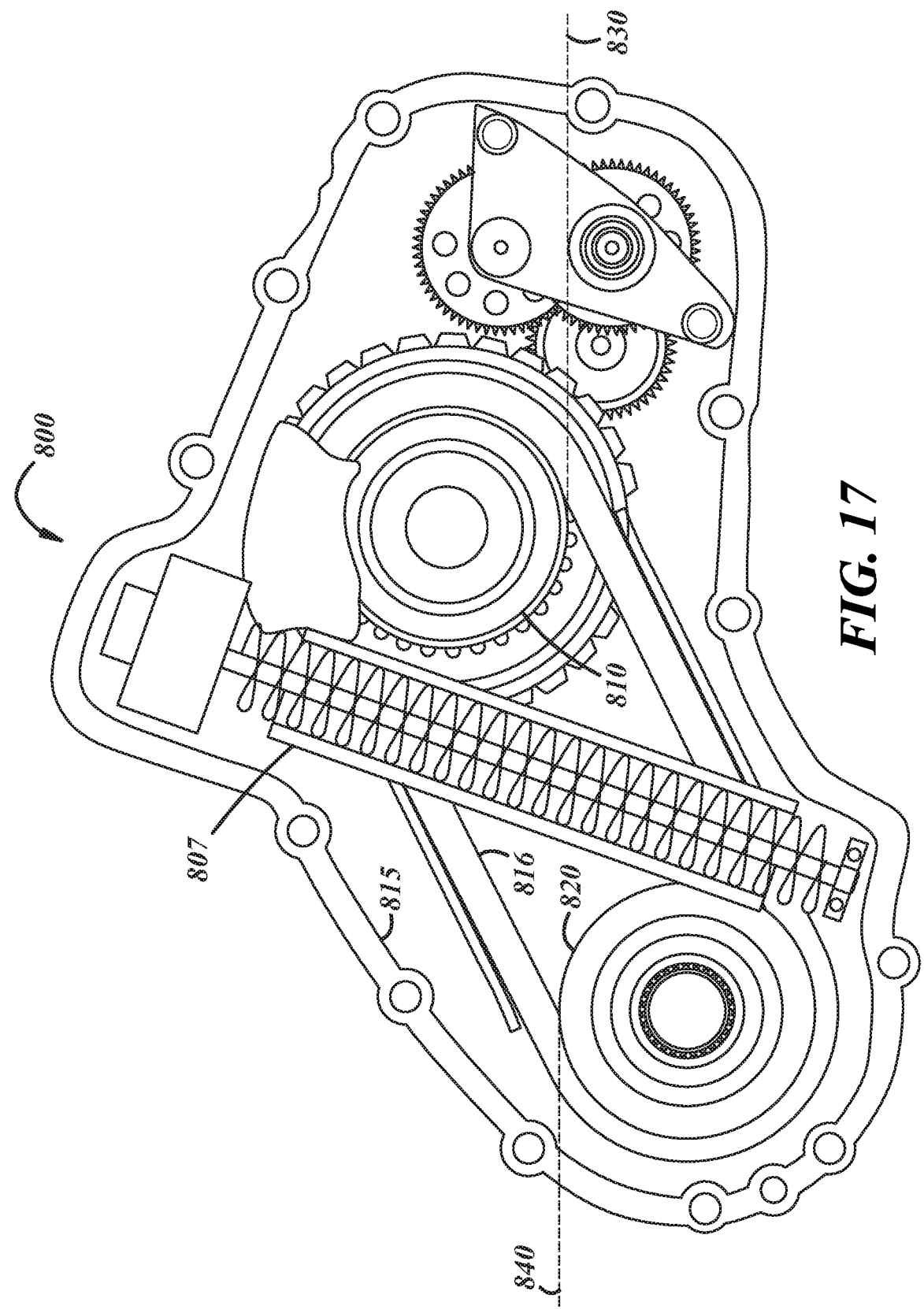
FIG. 17 is a sectional view of a preferred embodiment transfer case according to the present invention.

Referring to FIG. 17, an alternate preferred embodiment transfer case 800 of the present invention has Archimedes' screw pump 807 positioned internally of the housing 815 and in front of the flexible torsional force member chain 816. The transfer case in FIG. 17 is a low profile transfer case wherein a sprocket 810 connected with the primary shaft and a sprocket 820 connected with the secondary shaft have horizontal projections 830/820 vertically overlapping each other.

Figure 18:
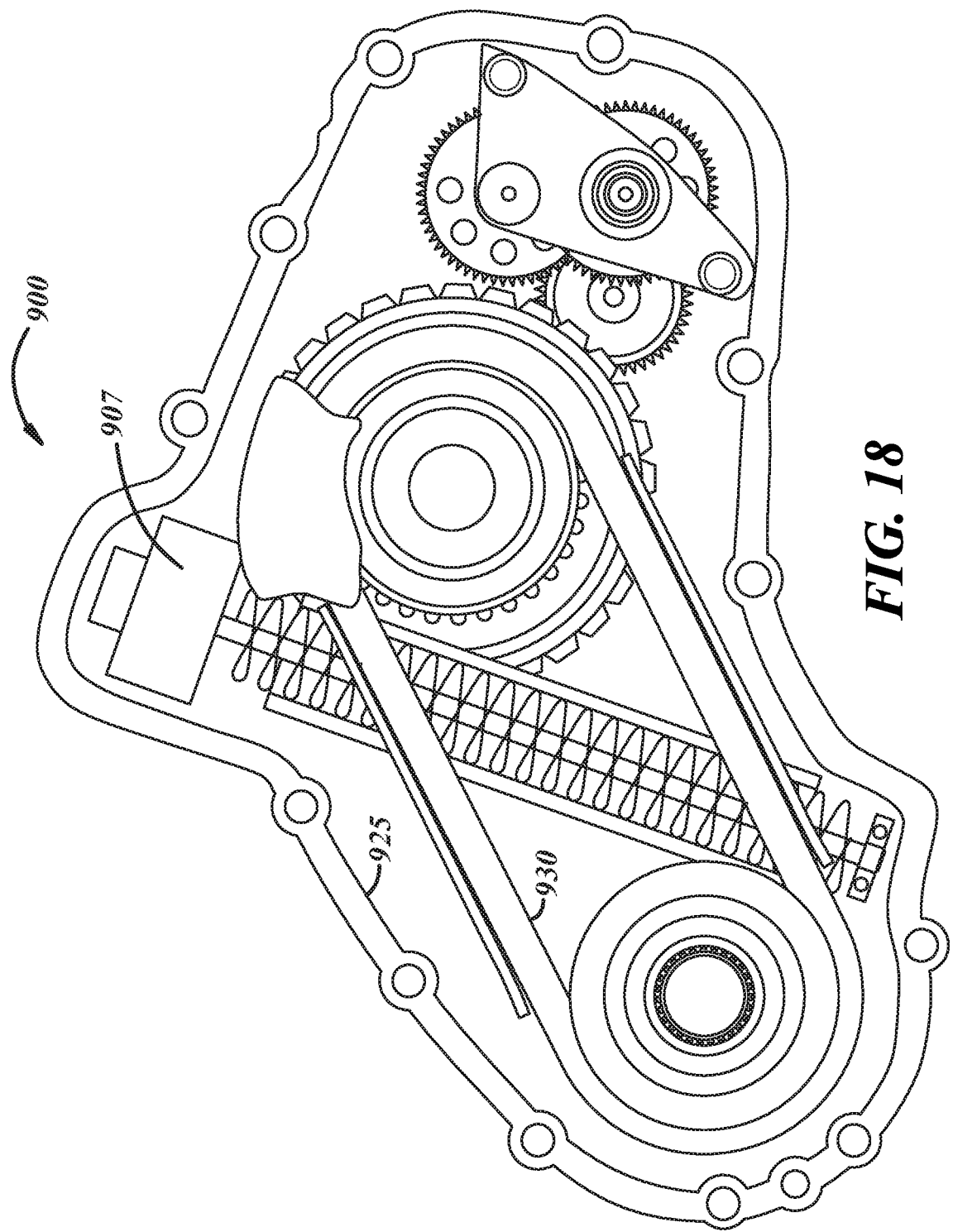
FIG. 18 is a sectional view of an alternate preferred embodiment transfer case according to the present invention.

FIG. 18 is another preferred embodiment transfer case 900 similar to that of FIG. 17, wherein the Archimedes' screw pump 907 is positioned internally in the housing 925 and to the rear of the flexible torsional force member (chain) 930.

In other embodiments (not shown) the Archimedes' screw pump casing can directly contact the transfer case housing cover plate or main body, or be internal of the transfer case housing positioned behind the clutch housing.

Figure 19:
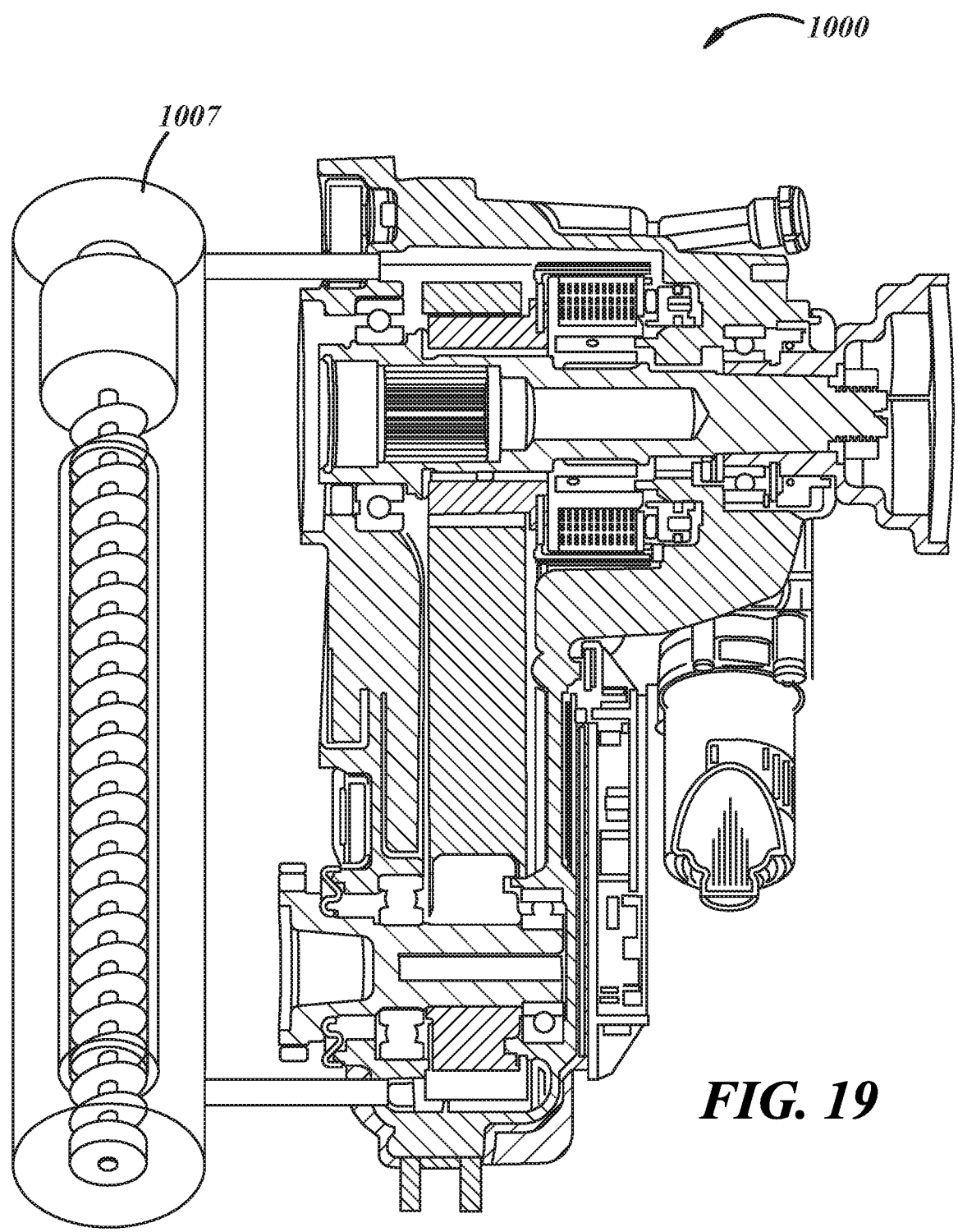
FIG. 19 is a side sectional view of an alternate preferred embodiment transfer case according to the present invention.
Figure 20:
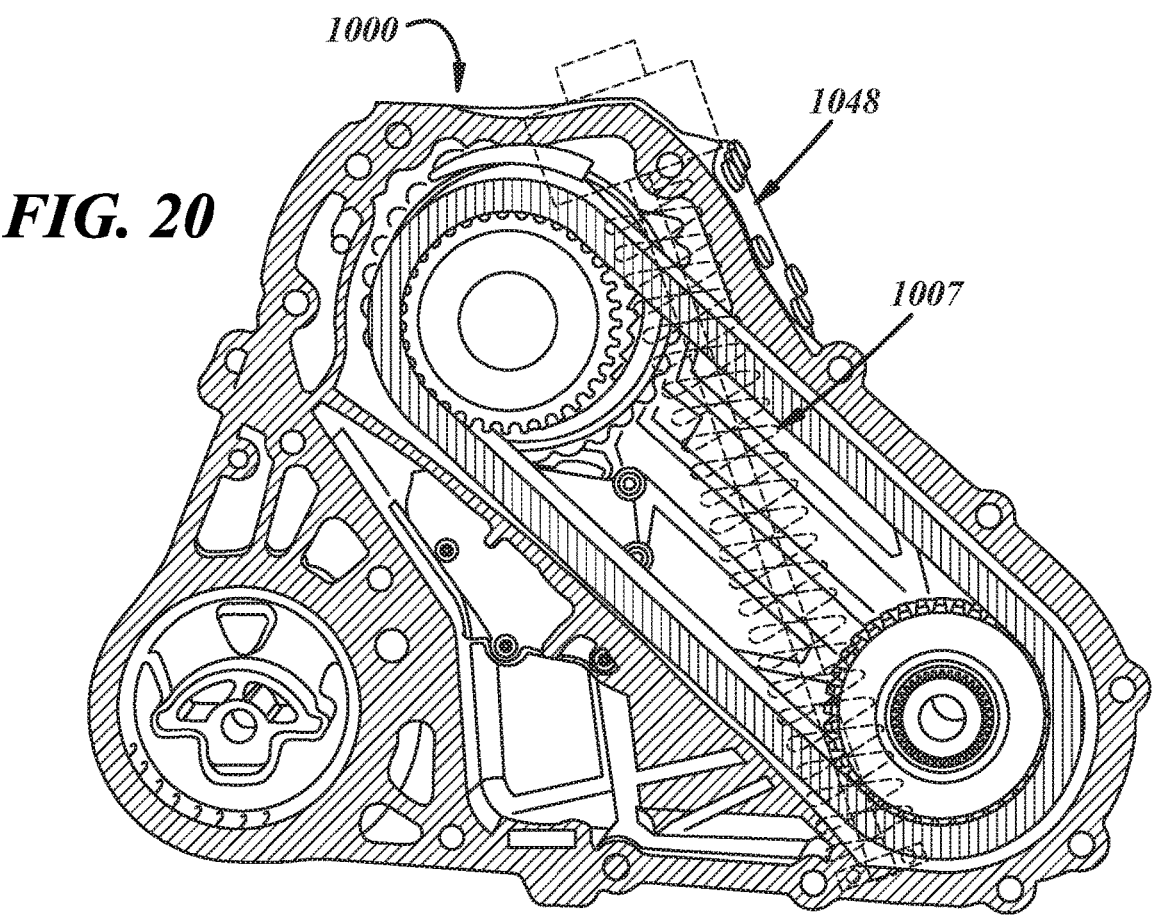
FIG. 20 is an enlarged front sectional view of the transfer case shown in FIG. 19.
Figure 21:
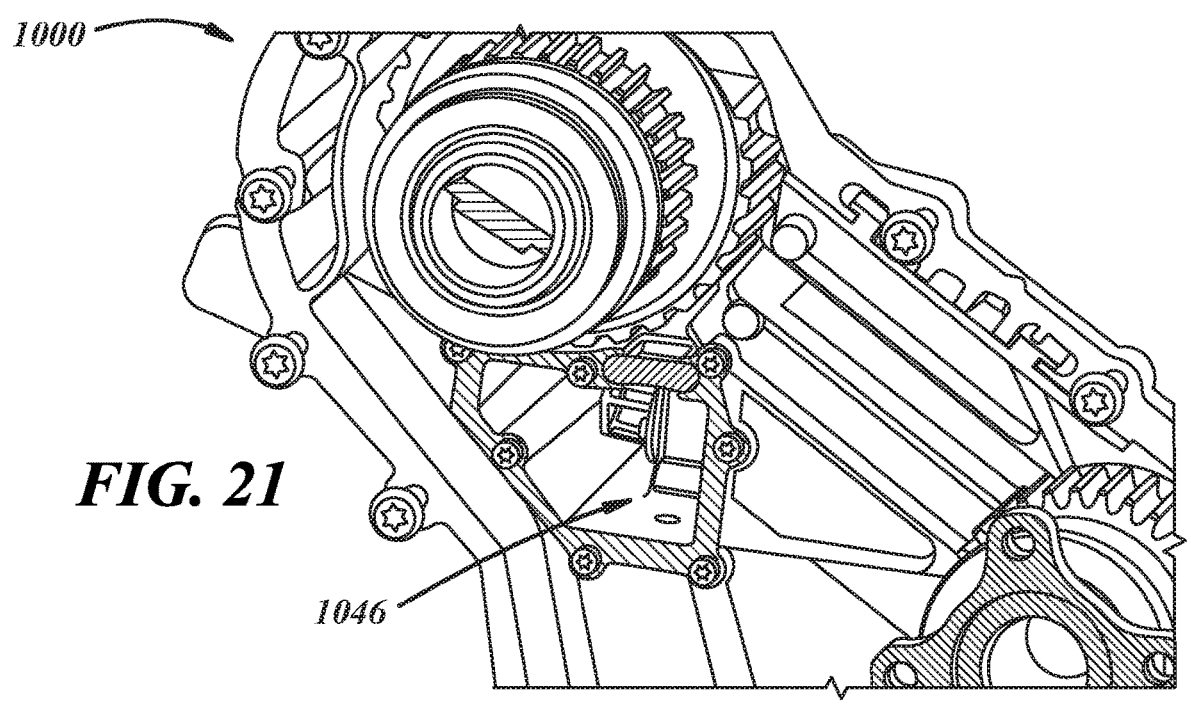
FIG. 21 is a sectional view of the transfer case shown in FIG. 19.

Referring to FIGS. 19-21, another alternate preferred embodiment transfer case 1000 (similar to U.S. Pat. No. 9,423,017) is provided, having a primary reservoir 1048 provided for lubrication of primary shaft and the clutch pack between a hub and clutch housing connected with the primary sprocket. A secondary reservoir 1046 provides a hydraulic system with fluid utilized to hydraulically power the clutch pack. The Archimedes' screw pump 1007 delivers lubrication to the primary reservoir 1048 which in turn delivers fluid to secondary reservoir 1046. In another embodiment (not shown), the Archimedes' screw pump delivers lubricant directly to the secondary reservoir 1046. In still another embodiment (not shown), an Archimedes' pump similar to that shown in FIG. 14 has two tubular members on a common shaft. One tubular member delivers lubrication to the primary reservoir 1048 and a second shorter tubular member delivers lubrication to the secondary reservoir 1046.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle transfer case comprising:
a housing;
a primary shaft rotatably mounted within said housing;
a secondary shaft selectively driven by said primary shaft, said secondary shaft being rotatably mounted by said housing;
a hub torsionally fixed with said primary shaft; a clutch housing selectively torsionally connected with said hub via friction packs;
an engagement wheel torsionally fixed with respect to said clutch housing and torsionally connected with said secondary shaft via a flexible torsional force member;
a friction pack engager to cause said clutch housing to be selectively connected with said hub;
a reservoir system fixed with respect to said housing for capturing splashed lubricant energized by result of operation of said flexible torsional force member and/or said clutch housing, delivering the splashed lubricant to a collective fluid receptacle, and said reservoir system having a stationary passage formed in said housing for transporting lubricant from said reservoir system to said primary shaft; and
an Archimedes' screw pump for delivering lubricant from a sump adjacent said secondary shaft to said reservoir system.

2. A vehicle transfer case as described in claim 1 wherein said Archimedes' screw pump is internal of said housing.

3. A vehicle transfer case as described in claim 2 wherein said Archimedes' screw pump is in front of said flexible torsional force member.

4. A vehicle transfer case as described in claim 2 wherein said Archimedes' screw pump is to the rear of said flexible torsional force member.

5. A vehicle transfer case as described in claim 2 wherein said Archimedes' screw pump is diagonally located through said flexible torsional force member.

6. A vehicle transfer case as described in claim 1 wherein said Archimedes' screw pump is external of said housing.

7. A vehicle transfer case as described in claim 6 wherein said Archimedes' screw pump is in front of said housing.

8. A vehicle transfer case as described in claim 6 wherein said Archimedes' screw pump is in the rear of said housing.

9. A vehicle transfer case as described in claim 1 wherein said transfer case has a secondary reservoir for a hydraulic circuit for the friction pack engager powering friction pack, and wherein lubricant from said flexible torsional force member gathers in the secondary reservoir.

10. A vehicle transfer case as described in claim 1 wherein said Archimedes' screw pump has a variable pitch screw.

11. A vehicle transfer case as described in claim 1 wherein said Archimedes' screw pump has an open cover.

12. A vehicle transfer case as described in claim 1 wherein said Archimedes' screw pump has a rotating cover.

13. A vehicle transfer case as described in claim 1 wherein said Archimedes' screw pump is tubular.

14. A vehicle transfer case as described in claim 1 wherein sprockets torsionally connected with said secondary shaft and clutch housing horizontally overlap each other.

15. A vehicle transfer case comprising:
a housing;
a primary shaft rotatably mounted within said housing;
a secondary shaft selectively driven by said primary shaft, said secondary shaft being rotatably mounted by said housing;
a hub torsionally fixed with said primary shaft;
a clutch housing selectively torsionally connected with said hub via a friction pack, said clutch housing having a series of holes to allow radial escape of lubricant;
an engagement wheel torsionally fixed with respect to said clutch housing and torsionally connected with said secondary shaft via a flexible torsional force member;
a friction pack engager to cause said clutch housing to be selectively connected with said hub;
a reservoir system fixed with respect to said housing for capturing splashed lubricant energized by result of operation of said flexible torsional force member and of said clutch housing, said reservoir system having a portion adjacent to said engagement wheel and said reservoir system channeling said lubricant in an axial direction overlapping said friction pack and delivering the lubricant to a collective fluid receptacle, and said reservoir system having a stationary passage formed in said housing for transporting lubricant from said reservoir system to said primary shaft radially inward of said friction pack; and
an Archimedes' screw pump for delivering lubricant from a sump adjacent said secondary shaft to said reservoir system.

16. A method of operating a vehicle transfer case comprising:
providing a housing;
providing a primary shaft rotatably mounted within said housing;
providing a secondary shaft selectively driven by said primary shaft, said secondary shaft being rotatably mounted by said housing;
providing a hub torsionally fixed with said primary shaft;
providing a clutch housing selectively torsionally connected with said hub via a friction pack;
providing an engagement wheel torsionally fixed with respect to said clutch housing and torsionally connected with said secondary shaft via a flexible torsional fore member;
providing a friction pack engager to cause said clutch housing to be selectively connected with said hub;
providing a reservoir system fixed with respect to said housing for capturing splashed lubricant energized by result of operation of said flexible torsional force member and of said clutch housing, and said reservoir system delivering the splashed lubricant to a collective fluid receptacle, and said reservoir system having a stationary passage formed in said housing for transporting lubricant from said reservoir system to said primary shaft; and
providing an Archimedes' screw pump for delivering lubricant from a sump adjacent said secondary shaft to said reservoir system, and operating said Archimedes' screw pump to deliver lubricant from said sump to said reservoir system.

17. The method as described in claim 16 wherein power to said Archimedes' screw pump is initiated by an ignition switch on a vehicle.

18. The method as described in claim 16 wherein power to said Archimedes' screw pump is initiated by relation of a throttle position of an engine of a vehicle.

19. The method as described in claim 16 wherein power to said Archimedes' screw pump is initiated based upon a relationship engine speed.

20. A method as described in claim 16 wherein said Archimedes' screw pump is initiated based upon a relationship of power demand of an engine of a vehicle.

* * * * *